United States Patent Office 2,987,457
Patented June 6, 1961

2,987,457
PROCESS FOR PREPARING V.I.-IMPROVING AGENTS
Robert O. Bolt, San Rafael, James G. Carroll, Martinez, and James R. Wright, El Cerrito, Calif., assignors, by mesne assignments, to the United States of America as represented by the United States Atomic Energy Commission
No Drawing. Filed Nov. 12, 1957, Ser. No. 695,531
6 Claims. (Cl. 204—162)

This invention is directed to a process of converting hydrocarbon materials of low molecular weight to polymeric hydrocarbon materials of high viscosity and capable of producing in low molecular weight hydrocarbons compositions having high viscosity indexes. In particular, this invention pertains to a process of transforming motor fuels to polymeric materials useful as viscosity index improvers.

It is generally known that the irradiation of organic liquids by means of neutrons, X-rays, or gamma rays often increases the viscosity, which is due to polymerization, cross-linking, etc. However, this change in viscosity is usually accompanied by only a slight change in the viscosity-temperature coefficient. Materials produced by this means have not been useful for improving the viscosity indexes of lubricating oils.

It is a primary object of this invention to set forth a process by which hydrocarbon materials of low boiling point can be converted to polymeric materials useful for improving viscosity-temperature characteristics of lubricating oils.

In accordance with the invention described herein, it has been discovered that viscosity index improving agents can be obtained by subjecting hydrocarbon materials of low boiling point to gamma radiation. Although it is well known in the art that irradiation of organic liquids increases the over-all viscosity of the irradiated organic fluid, it is not known that the irradiation of low molecular weight hydrocarbons according to the process herein results in the formation of viscous liquids capable of imparting high viscosity indexes to liquids having lubricating characteristics; that is, the slopes of the viscosity-temperature curves of the resulting lubricating oils have values no greater than about 0.5.

The low molecular weight hydrocarbon materials are hydrocarbons (e.g., petroleum distillates) boiling predominantly in the range of about 0° C. to about 210° C. Such hydrocarbons include n-pentane, n-hexane, 2-methylpentane, 2,2-dimethylbutane, 2,3-dimethylbutane, n-heptane, 2-methylhexane, 2,2-dimethylpentane, 2,4-dimethylpentane, n-octane, 2-methylheptane, 2,2-dimethylhexane, 3,4-dimethylhexane, 2,2,3-trimethylpentane, 2,2,4-trimethylpentane (isooctane), hexamethylethylene, n-nonane, 3-methyloctane, 2,2-dimethylheptane, 3,4-dimethylheptane, 3,3-dimethyloctane, 3,4-dimethylhexane, mixtures thereof, etc. These hydrocarbons of themselves or mixtures thereof may be subjected to gamma irradiation. Mixtures of these hydrocarbons appear in such compositions known as gasolines, naphthas, petroleum ether, etc.

The light hydrocarbon materials may be subjected to gamma radiation at temperatures below the boiling point thereof at atmospheric pressures or at higher temperatures under pressures above atmospheric. It is preferred to use ambient temperatures or temperatures above ambient temperatures at atmospheric pressures for a period of time sufficient to form the desired polymeric material. Exceptional results from this process are obtained by subjecting a gasoline fraction to gamma radiation for a period of time sufficient to give a total dosage equivalent to about $2.5 \times 10^9$ to $6.0 \times 10^9$ roentgens.

The gamma radiation source used herein was the spent nuclear reactor fuel element facility. This was located at the Materials Testing Reactor, National Reactor Testing Station, Idaho.

The degree of polymerization desired can be governed by the total amount of radiation given to the light boiling hydrocarbon material. The longer the irradiation time, the greater the molecular weight and the viscosities of the end products obtained. The important criterion here is the total radiation dosage.

The formation of polymeric viscosity index improving agents by subjecting hydrocarbon materials of low boiling point to gamma radiation is illustrated by the data hereinbelow.

Table I presents the distillation characteristics of hydrocarbon materials prior to irradiation.

*Table I*
DISTILLATION DATA—MIXTURES OF HYDROCARBONS BEFORE IRRADIATION (TEMPERATURES IN ° F.)

| Hydrocarbon Sample | Boiling Point (° F.) at Percent Fraction Distilled | | | | | | | | | | |
|---|---|---|---|---|---|---|---|---|---|---|---|
| | Initial | 10 | 20 | 30 | 40 | 50 | 60 | 70 | 80 | 90 | EP |
| A | 212 | 220 | 226 | 230 | 233 | 240 | 246 | 250 | 258 | 272 | 318 |
| B | 162 | 181 | 190 | 202 | 221 | 256 | 310 | 408 | 430 | 480 | 528 |
| C | 152 | 220 | 258 | 306 | 330 | 352 | 380 | 401 | 421 | 452 | 483 |

Table II hereinbelow sets forth the distillation characteristics of hydrocarbon materials obtained after subjecting the above samples A, B, and C to gamma radiation.

*Table II*
DISTILLATION DATA—MIXTURES OF HYDROCARBONS AFTER IRRADIATION (TEMPERATURES IN ° F.)

| Hydrocarbon Sample | Dosage, $10^8$ r. | Boiling Point (° F.) at Percent Fraction Distilled | | | | | | | | | | |
|---|---|---|---|---|---|---|---|---|---|---|---|---|
| | | 0 | 10 | 20 | 30 | 40 | 50 | 60 | 70 | 80 | 90 | EP |
| A | 4.80 | 138 | 172 | 184 | 202 | 218 | 222 | 230 | 242 | 260 | 402 | 542 |
| | 14.8 | 136 | 163 | 188 | 206 | 218 | 228 | 236 | 256 | 380 | 536 | 591 |
| | 43.8 | 168 | 173 | 181 | 201 | 263 | 392 | 421 | 456 | 602 | 630 | 731 |
| B | 5.41 | 152 | 210 | 215 | 262 | 305 | 323 | 392 | 410 | 492 | 622 | 662 |
| | 16.3 | 160 | 192 | 210 | 281 | 304 | 378 | 520 | 587 | 640 | 645 | 659 |
| | 51.2 | 210 | 222 | 239 | 276 | 298 | 330 | 362 | 426 | 500 | 580 | 642 |
| C | 5.41 | 152 | 222 | 284 | 321 | 362 | 382 | 401 | 420 | 480 | 560 | 572 |
| | 16.3 | 238 | 246 | 253 | 291 | 346 | 402 | 480 | 562 | 592 | 636 | 646 |
| | 51.2 | 286 | 300 | 340 | 362 | 420 | 500 | 562 | 580 | 631 | 660 | 682 |

It is readily seen that considerably higher boiling fractions were obtained. The effect of these high boiling materials on the viscosity-temperature coefficient of the hydrocarbon materials is shown by Table III hereinbelow. The effect is expressed in terms of the ASTM slope, which is obtained by plotting the viscosities of hydrocarbons at various temperatures on ASTM viscosity-temperature paper. A slope having a low value indicates a small change in viscosity with temperature.

Table III
EFFECT OF GAMMA RADIATION ON HYDROCARBON FRACTIONS

| Sample | Viscosity at 210° F., cs., and ASTM Slope | | | | | |
|---|---|---|---|---|---|---|
| | Original | | After Exposure to ~4×10⁹ r. | | After Exposure to ~5×10⁹ r. | |
| | Viscosity | Slope | Viscosity | Slope | Viscosity | Slope |
| A | 0.61 | 0.80 | 3.60 | 0.42 | 9.4 | 0.24 |
| B | 0.83 | 0.82 | 13.5 | 0.42 | 114 | 0.52 |
| C | 0.98 | 0.83 | 18.4 | 0.45 | 166 | 0.49 |

By comparing the data in Table III for the original hydrocarbon material with that of the irradiated hydrocarbon material, it is apparent that the gamma irradiation has resulted in the formation of excellent viscosity index-improving agents.

Data illustrating other physical characteristics of the original hydrocarbon composition and the irradiated composition are set forth in Table IV.

Table IV

| Hydrocarbon Sample | Total Dosage, 10⁸ r. | Density, $d\frac{20}{4}$ | Bromine No. | −30° F. | 77° F. | 100° F. | 210° F. |
|---|---|---|---|---|---|---|---|
| A | 0 | 0.7502 | 2 | 1.539 | 0.686 | | |
| A | 4.80 | 0.7372 | 12 | 1.634 | 0.723 | | |
| A | 14.8 | 0.7468 | 13 | 1.967 | 0.822 | | |
| A | 43.8 | 0.8429 | 14 | | | 9.4 | 5.76 |

The compositions formed according to the process of this invention are of themselves characterized as having high viscosity indexes. Since it is possible to use as the original reactant a low molecular weight, low-boiling hydrocarbon, the resulting solution obtained by treating such a low molecular weight hydrocarbon with gamma radiation has a viscosity-temperature curve of less than 0.5. In numerous instances it is beneficial to separate the polymeric material thus formed (i.e., the viscosity index improving agent) from the lower molecular weight fraction, and incorporate this high molecular weight component having outstanding viscosity-index characteristics in a lubricating oil composition of low viscosity index. The viscosity-temperature curve of the final lubricating oil composition will have a slope of extremely low value and will have been markedly improved.

We claim:

1. A process for converting a low boiling hydrocarbon material to a composition containing a polymeric material, which composition is characterized by a high viscosity index, comprising subjecting a paraffin hydrocarbon material boiling predominantly in the range of about 0° C. to about 210° C. to gamma radiation equivalent to a total dosage of from about 2.5×10⁹ roentgens to about 6.0×10⁹ roentgens.

2. A process for producing a polymeric viscosity index improving agent comprising subjecting a petroleum distillate boiling predominantly in the range of about 0° C. to about 210° C. to gamma radiation equivalent to a total dosage of from about 2.5×10⁹ roentgens to about 6.0×10⁹ roentgens.

3. A process for producing a polymeric viscosity index improving agent comprising subjecting a petroleum distillate boiling predominantly in the range of about 0° C. to about 210° C. to gamma radiation equivalent to a total dosage of radiation from about 2.0×10⁹ roentgens to about 6.0×10⁹ roentgens to produce a composition which has a viscosity-temperature curve slope no greater than about 0.5.

4. The process of claim 3, wherein said petroleum distillate is a gasoline fraction.

5. A process for producing a polymeric viscosity index improving agent comprising subjecting a petroleum distillate boiling predominantly in the range of about 0° C. to about 210° C. to gamma radiation equivalent to a total dosage of radiation of from about 2.5×10⁹ roentgens at temperatures below the boiling point of said distillate to produce a composition which has a viscosity-temperature curve slope no greater than about 0.5.

6. A process for producing a polymeric viscosity index improving agent comprising subjecting a petroleum distillate boiling predominantly in the range of about 0° C. to about 210° C. to gamma radiation equivalent to a total dosage of radiation from about 2.5×10⁹ roentgens to about 6.0×10⁹ roentgens at ambient temperatures to produce a composition which has a viscosity-temperature curve slope no greater than about 0.5.

References Cited in the file of this patent
UNITED STATES PATENTS

| 2,138,868 | Liberthson | Dec. 6, 1938 |
| 2,845,388 | Black et al. | July 29, 1958 |

OTHER REFERENCES

Martin: Chemical and Engineering News, vol. 33, No. 14 (April 4, 1955), pp. 1425 and 1428.

Mincher: AEC, Summary of Available Data on Radiation Damage to Various Non-metallic Materials, April 2, 1952, pp. 3 and 5.